United States Patent
Wang et al.

(10) Patent No.: US 7,915,871 B2
(45) Date of Patent: Mar. 29, 2011

(54) SYSTEMS AND METHODS FOR DC TO DC CONVERSION WITH CURRENT MODE CONTROL

(75) Inventors: Jin Wang, Shanghai (CN); Vincent L. Fong, Cupertino, CA (US)

(73) Assignee: PacificTech Microelectronics, Inc. (KY)

( * ) Notice: Subject to any disclaimer, the term of this patent is extended or adjusted under 35 U.S.C. 154(b) by 169 days.

(21) Appl. No.: 12/020,262

(22) Filed: Jan. 25, 2008

(65) Prior Publication Data

US 2009/0190377 A1    Jul. 30, 2009

(51) Int. Cl.
G05F 1/10       (2006.01)
G05F 1/656      (2006.01)

(52) U.S. Cl. ......... 323/222; 323/282; 323/284; 323/286
(58) Field of Classification Search .............. 323/222, 323/282, 284, 286
See application file for complete search history.

(56) References Cited

U.S. PATENT DOCUMENTS

| | | | |
|---|---|---|---|
| 6,366,070 B1 * | 4/2002 | Cooke et al. | 323/284 |
| 7,002,325 B2 * | 2/2006 | Harris et al. | 323/272 |
| 7,061,215 B2 * | 6/2006 | Harris | 323/268 |
| 7,148,669 B2 * | 12/2006 | Maksimovic et al. | 323/283 |
| 7,242,170 B1 * | 7/2007 | Natsume | 323/222 |
| 7,365,525 B2 * | 4/2008 | Zhou et al. | 323/282 |
| 7,394,231 B2 * | 7/2008 | Flatness et al. | 323/259 |
| 7,432,695 B2 * | 10/2008 | Salerno | 323/284 |
| 7,466,112 B2 * | 12/2008 | Zhou et al. | 323/259 |
| 7,579,818 B2 * | 8/2009 | Ball et al. | 323/284 |
| 2005/0168198 A1 * | 8/2005 | Maksimovic et al. | 323/222 |
| 2006/0043942 A1 * | 3/2006 | Cohen | 323/207 |
| 2008/0297122 A1 * | 12/2008 | Zhou et al. | 323/222 |

* cited by examiner

Primary Examiner — Bao Q Vu
(74) Attorney, Agent, or Firm — Chad R. Walsh; Fountainhead Law Group PC

(57) ABSTRACT

In one embodiment the present invention includes a DC to DC converter device which includes an electronic circuit. The electronic circuit comprises a first comparator, a second comparator, a first switch, a first latch, and a current sensor. The inductor current includes a peak current value and a valley current value. The first comparator detects the peak current value and resets the first latch which opens the first switch. The second comparator detects the valley current value and sets the first latch which closes the first switch. The current sensor is coupled to sense an inductor current flowing through an output load, and is coupled to provide a sense voltage to the first and second comparators. In this manner, the electronic circuit provides DC to DC conversion with current control.

22 Claims, 4 Drawing Sheets

SYSTEMS AND METHODS FOR DC TO DC CONVERSION WITH CURRENT MODE CONTROL

CROSS REFERENCE TO RELATED APPLICATIONS

Not Applicable

BACKGROUND

The present invention relates to power conversion, and more particularly, to systems and methods for DC to DC conversion with current control.

Power management is extremely important in portable electronic devices due to the limited energy available in a battery supply. Switching regulators have helped improve efficiency and have resulted in extended operating times between recharging of the battery. Switching regulator design and implementation has historically been problematic due to the application requirements for varying load currents and in the difficulty in selecting appropriate compensation to guarantee stability over a range of loads. For example, a switching regulator design may require a narrow range of inductor values in order to operate. Additionally, switching regulators using peak current control methods presently used in the art require additional slope compensation to prevent sub-harmonic oscillation.

The present invention solves these and other problems with systems and methods for DC to DC conversion with current control.

SUMMARY

Embodiments of the present invention improve systems and methods of DC to DC conversion with current control. In one embodiment the present invention includes a DC to DC converter device which includes an electronic circuit. The electronic circuit comprises a first comparator, a second comparator, a first switch, a first latch, and a current sensor. The first comparator has an inverting terminal coupled to receive a first reference signal, a non-inverting terminal, and an output terminal, The second comparator has an inverting terminal, a non-inverting terminal coupled to receive the first reference signal, and an output terminal. The first switch has a first terminal coupled to a first voltage source, a second terminal coupled to an output load, and a control terminal. The first latch has a set terminal coupled to the output of the second comparator, a reset terminal coupled to the output of the first comparator, and an output coupled to the control input of the first switch. The current sensor is coupled to sense an inductor current flowing through the output load, and is coupled to provide a sense voltage to the non-inverting terminal of the first comparator and the inverting terminal of the second comparator. The sense voltage corresponds to the inductor current. The inductor current includes a peak current value and a valley current value. The peak current value is higher than the valley current value. The first comparator detects the peak current value and provides a first component of a first comparator output signal which resets the first latch. The first latch provides a first component of the first latch output signal to open the first switch in response to the first component of the first comparator output signal. The second comparator detects the valley current value and provides a first component of a second comparator output signal which sets the first latch. The first latch provides a second component of the first latch output signal to close the first switch in response to the first component of the second comparator output signal.

In one embodiment, the first switch is a field effect transistor.

In one embodiment, the electronic circuit further comprises a first diode having a first terminal coupled to the output load, a second terminal coupled to a return reference voltage.

In one embodiment, the return reference voltage is ground.

In one embodiment, the electronic circuit further comprises a second switch and a second latch. The second switch has a first terminal coupled to the output load, a second terminal coupled to a return reference voltage, and a control terminal. The second latch has a set terminal coupled to the output of the first comparator, a reset terminal coupled to the output of the second comparator, and an output coupled to the control input of the second switch. The first component of the first comparator output signal sets the second latch. The second latch provides a first component of the second latch output signal to close the second switch in response to the first component of the first comparator output signal. The first component of the second comparator output signal resets the second latch. The second latch provides a second component of the second latch output signal to open the second switch in response to the first component of the second comparator output signal.

In one embodiment, the first switch and the second switch are field effect transistors.

In one embodiment, the electronic circuit further comprises a current limit circuit comprising a third comparator. The third comparator has a non-inverting terminal, an inverting terminal, and an output terminal. The non-inverting terminal is coupled to receive the sense voltage. The inverting terminal is coupled to a current limit reference voltage having a current limit reference voltage value. The output terminal is coupled to provide a third comparator output signal when the sense voltage exceeds the current limit reference voltage value. The third comparator output signal resets the first latch. The first latch provides the first component of the first latch output signal to open the first switch in response to the third comparator output signal. The third comparator output signal sets the second latch. The second latch provides the first component of the second latch output signal to open the first switch in response to the third comparator output signal.

In one embodiment, the electronic circuit further comprises a first voltage reference and a second voltage reference. The first voltage reference has a first terminal coupled to the inverting terminal of the first comparator and a second terminal coupled to receive a first reference signal. The first voltage reference provides a first reference voltage. The second voltage reference has a first terminal coupled to receive the first reference signal and a second terminal coupled to the non-inverting terminal of the second comparator. The second voltage reference provides a second reference voltage. A peak detect threshold comprises the first reference signal and the first reference voltage. A valley detect threshold comprises the first reference signal and the second reference voltage.

In one embodiment, the electronic circuit further comprises a divider circuit, a loop amplifier, and a loop voltage reference. The divider circuit is coupled to receive an output voltage and is coupled to provide a scaled output voltage. The loop amplifier has a non-inverting terminal, an inverting terminal and an output terminal. The inverting terminal is coupled to receive the scaled output voltage, and the output terminal is coupled to provide the first reference signal. The loop voltage reference has a first terminal and a second terminal. The first terminal is coupled to the non-inverting terminal of the loop amplifier and the second terminal is coupled to a return reference voltage. The loop voltage reference provides a loop reference voltage. The loop amplifier generates the first reference signal in which the scaled output voltage matches the loop reference voltage, in accordance therewith provides the output voltage corresponding to the loop reference voltage.

In one embodiment, the loop amplifier is a transconductance amplifier and the electronic circuit further comprises a first resister. The first resistor has a first terminal is coupled to the output of the loop amplifier and a second terminal is coupled a return reference voltage.

In one embodiment, the first reference voltage, the second reference voltage, and the third reference voltage are predetermined.

In one embodiment, the present invention includes a voltage regulator device including an electronic circuit, the electronic circuit comprising a first comparator, a second comparator, a first switch, a first latch, a sense resistor, and a differential amplifier. The first comparator has an inverting terminal coupled to receive a first reference signal, a non-inverting terminal, and an output terminal. The second comparator has an inverting terminal, a non-inverting terminal coupled to receive the first reference signal, and an output terminal. The first switch has a first terminal coupled to a first voltage source, a second terminal coupled to an output load, and a control terminal. The first latch has a set terminal coupled to the output of the second comparator, a reset terminal coupled to the output of the first comparator, and an output terminal coupled to the control input of the first switch. The sense resistor has a first tenninal coupled to the second terminal of the first switch and a second terminal coupled to the output load. The differential amplifier has a first terminal coupled to the first terminal of the sense resistor, a second terminal coupled to the second terminal of the sense resistor, and an output terminal coupled to provide a sense voltage to the non-inverting terminal of the first comparator and the inverting terminal of the second comparator. The sense voltage corresponds to the inductor current. The inductor current includes a peak current value and a valley current value. The peak current value is higher than the valley current value. The first comparator detects the peak current value and provides a first component of a first comparator output signal which resets the first latch. The first latch provides a first component of the first latch output signal to open the first switch in response to the first component of the first comparator output signal. The second comparator detects the valley current value and provides a first component of a second comparator output signal which sets the first latch. The first latch provides a second component of the first latch output signal to close the first switch in response to the first component of the second comparator output signal.

In one embodiment, the present invention includes a method for providing DC to DC conversion comprising the steps of sensing an inductor current, detecting the peak current value, latching a first switch open, detecting the valley current value, and latching the first switch closed. The output load has a peak current value and a valley current value. The peak current value is higher than the valley current value. The inductor current passes through a load. The step of latching a first switch open is in response to detecting the peak current value. The step of latching the first switch closed is in response to detecting the valley current value. The step of latching the first switch open allows the inductor current to decrease to the valley current value. The step of latching the first switch closed allows the inductor current to increase to the peak current value.

In one embodiment, the method further comprises latching a second switch closed in response to detecting the peak current value, and latching the second switch open in response to detecting the valley current value. The step of latching the first switch open and the step of latching the second switch closed allows the inductor current to decrease to the valley current value. The step of latching the first switch closed and the step of latching the second switch open allows the inductor current to increase to the peak current value.

In one embodiment, the method further comprises the steps of scaling an output voltage, amplifying, setting a peak detect level, setting a valley detect level. The step of scaling the output voltage results in a scaled output voltage. The step of amplifying includes amplifying a difference between the scaled output voltage and a first reference voltage. This results in a first reference signal. Setting a peak detect level is based on the first reference signal and a second reference voltage. Setting a valley detect level is based on the first reference signal and a third reference voltage. The first reference voltage, the second reference voltage, and the third reference voltage are predetermined. The step of amplifying generates the first reference signal in which the scaled output voltage matches the first reference voltage, and in accordance therewith providing the output voltage corresponding to the first reference voltage.

The following detailed description and accompanying drawings provide a better understanding of the nature and advantages of the present invention.

DETAILED DESCRIPTION

Described herein are techniques for DC to DC conversion with current control. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
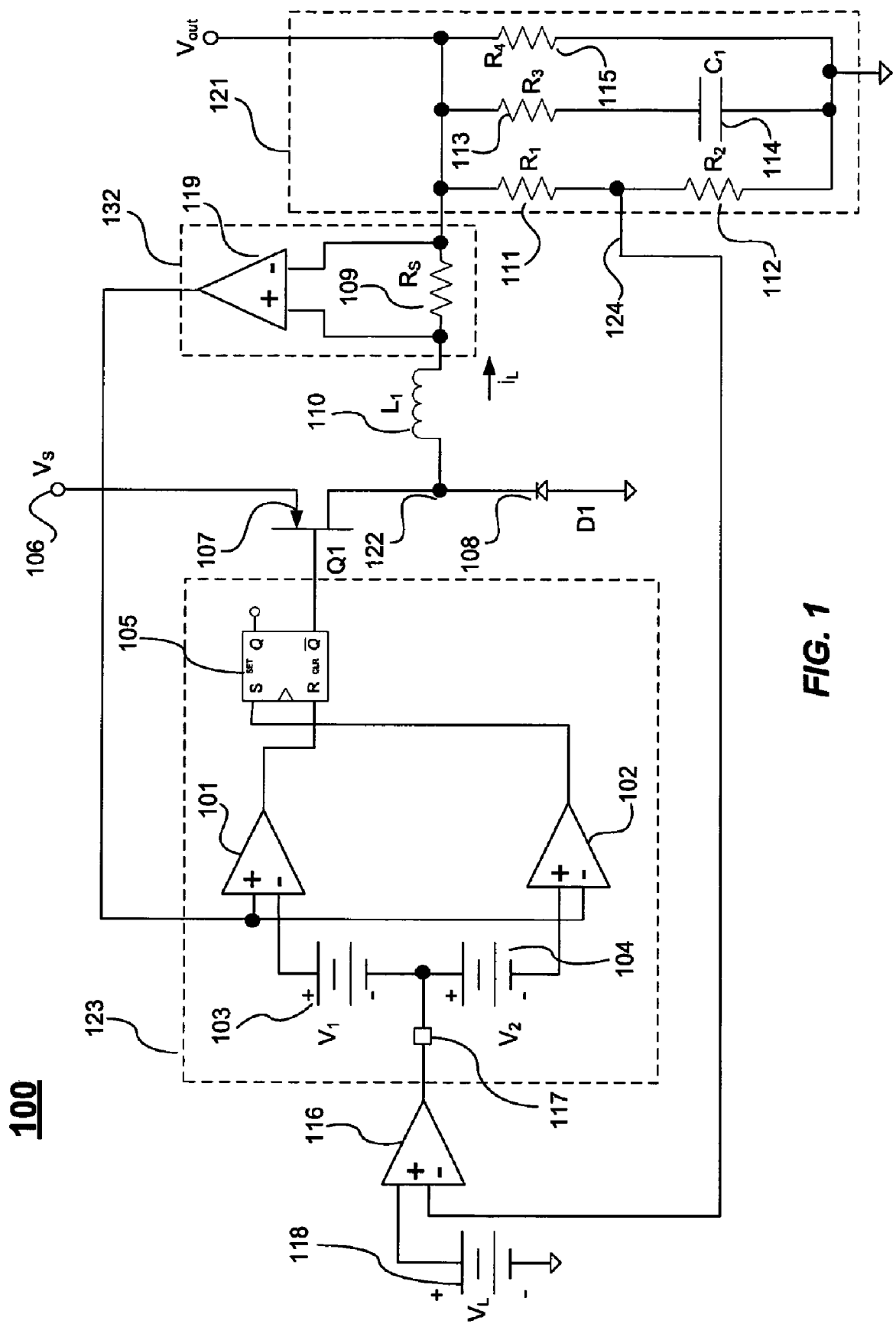
FIG. 1 illustrates an electronic circuit according to one embodiment of the present invention.

FIG. 1 illustrates an electronic circuit 100 according to one embodiment of the present invention. The electronic circuit 100 is configured to act as a buck converter which has current mode control. The electronic circuit utilizes an inductor current peak value and an inductor current valley value to control a switch. Electronic circuit 100 includes a logic drive circuit 123, a switch 107, a diode 108, a loop amplifier 116, a loop voltage reference 118, a current sensor 120, an inductor 110, and an output load 121. The logic drive circuit 123 provides a drive signal which opens and closes switch 107. The opening and closing of switch 107 generates a switching current at the switch node 122. The diode 108 rectifies the switching current such that when the switch 107 is open, the diode may provide for a current path for an inductor current $i_L$ to flow through inductor 110, sense resistor 109, and the output load 121. The logic drive circuit 123 provides a control input to the switch 107. The logic drive circuit 123 receives a sense voltage from the current sensor 120 and a reference signal from the loop amplifier 116. The loop amplifier 116 provides a logic drive reference signal such that a scaled output voltage from an intermediate node 124 of the output load 121 matches the voltage of the loop voltage reference 118, and accordingly the logic drive circuit 123 provides a control signal which produces an output voltage $V_{OUT}$ across the output load 121 which corresponds to the voltage of the loop voltage reference 118.

The current sensor 120 is coupled to sense the inductor current and provide the sense voltage to the logic drive circuit 123. The sense voltage corresponds to the inductor current $i_L$. In this embodiment, current sensor 120 includes a sense resistor 109 and a differential amplifier 119. The inductor current $i_L$ is sensed by converting $i_L$ into a small voltage across the sense resistor 109 and amplifying the small voltage with the differential amplifier 119. Amplifier 119 produces a sense voltage which corresponds to the inductor current $i_L$. Other sense circuitry may be employed to sense the output current including diverting a proportional current of the inductor current $i_L$. A current sensor may also extrapolate the inductor current $i_L$ from some intermediate current, for example. In one embodiment, the current sensor may be a sense transistor which diverts a proportional current from a switch transistor. The current sensor provides the sense voltage corresponding to the inductor current $i_L$. The sense voltage provides peak current feedback which limits the peak current delivered from the power source $V_S$ to the output load 121.

The logic drive circuit 123 includes a comparator 101, a comparator 102, a voltage reference 103, a voltage reference 104, and a latch 105. The inductor current $i_L$ includes a peak current value and a valley current value, the peak current value being higher than the valley current value. The comparator 101 detects the peak current value and provides a first component of a first comparator output signal which resets the latch 105. The latch 105 provides a first component of the first latch output signal to open the switch 107 in response to the first component of the first comparator output signal. The comparator 102 detects the valley current value and provides a first component of a second comparator output signal which sets the latch 105. The latch 105 provides a second component of the first latch output signal to close the switch 107 in response to the first component of the second comparator output signal. The logic drive reference signal at node 117 and the voltage reference 103 set a peak detect threshold at an inverting tenninal of the comparator 101. The sense voltage is provided to a non-inverting terminal of the comparator 101 and an inverting terminal of the comparator 102. The logic drive reference signal at node 117 and the voltage reference 104 set a valley detect threshold at an non-inverting terminal of the comparator 102.

The inductor current $i_L$ flows through the output load and generates the output load voltage $V_{OUT}$. The the inductor 110, sense resistor 109, and the output load 121 are coupled in series. The output load 121 includes a load resistor 111, a load resistor 112, a load resistor 113, a load resistor 115, and a capacitor 114. The load resistor 111 and the load resistor 112 form a voltage divider and provide the scaled output voltage. The load resistor 113, the load resistor 115, and the capacitor 114 form a compensation network. Resistor 113 and capacitor 114 may form a electrolytic capacitor in which resistor 113 represents the effective series resistance (ESR) of the electrolytic capacitor. This may be important for compensation.

The switch 107 may be a field effect transistor (FET). The switch 107 may be an NMOS, a PMOS, or an IGBT device. The loop amplifier 116 may be a transconductance amplifier and an additional impedance network may be added to node 117 in order to convert the output current from the loop amplifier 116 to a voltage. The node 117 may also be coupled to a network to aid in compensation, startup, or both. The loop voltage reference 118, the voltage reference 103, the voltage reference 104, or any combination thereof may be designed with a predetermined value. For example, the loop voltage reference 118 may be comprised of a band gap reference circuit.

In another embodiment the diode 108 may be replaced by a rectifying switch. Switch 107 may be driven by a driver such as an inverter, a buffer, a bootstrapped circuit, or any circuit which may provide the signal required to drive switch 107 closed and open. A similar driver may be used to drive the rectifying switch as well. Switch 107 will be closed when the rectifying switch is opened and switch 107 will be opened when the rectifying switch is closed. The rectifying switch may be a field effect transistor (FET). The rectifying switch may be an NMOS, a PMOS, or an IGBT device.

Figure 2:
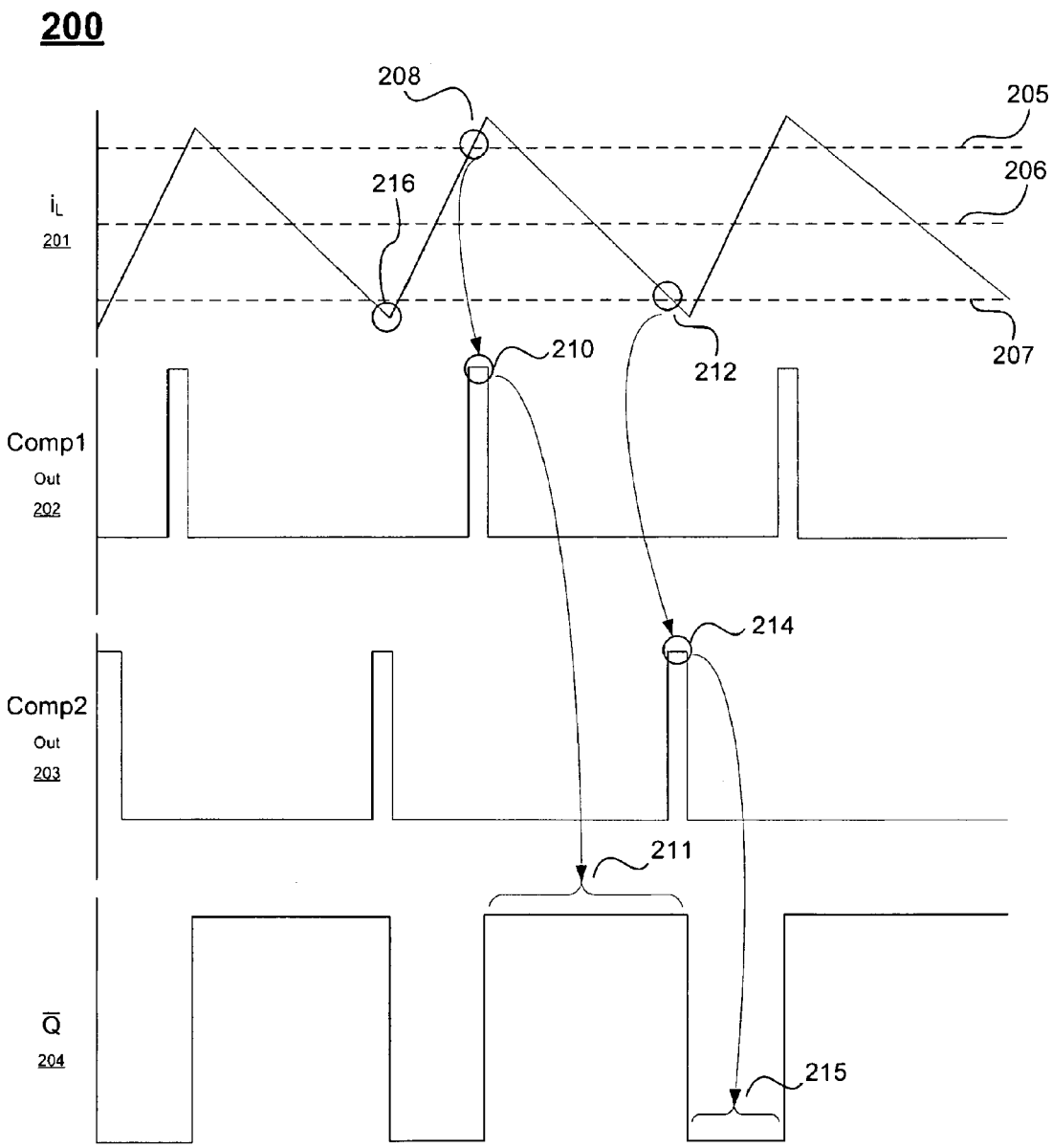
FIG. 2 illustrates a timing diagram associated with the embodiment of FIG. 1.

FIG. 2 illustrates a timing diagram 200 associated with the embodiment of FIG. 1. Timing diagram 200 includes an inductor current signal 201, a first comparator output signal 202, a second comparator output signal 203, and a latch output signal 204. At point 216, the switch 107 (See FIG. 1) closes and the inductor current signal 201 begins to rise until it reaches the peak current value 205 at point 208. The comparator 101 detects the peak current value 205 and provides the first component 210 of the first comparator output signal 202 which resets the latch 105. The latch 105 provides a first component 211 of the latch output signal 204 to open the switch 107 in response to the first component 210 of the first comparator output signal 202. The inductor current signal 201 falls until it reaches the valley current value 207 at point 212. The comparator 102 detects the valley current value 207 and provides the first component 214 of the second comparator output signal 203 which sets the latch 105. The latch 105 provides a second component 215 of the latch output signal 204 to close the switch 107 in response to the first component 214 of the second comparator output signal 203. Once again the inductor current signal 201 begins to rise and the cycle repeats.

Figure 3:
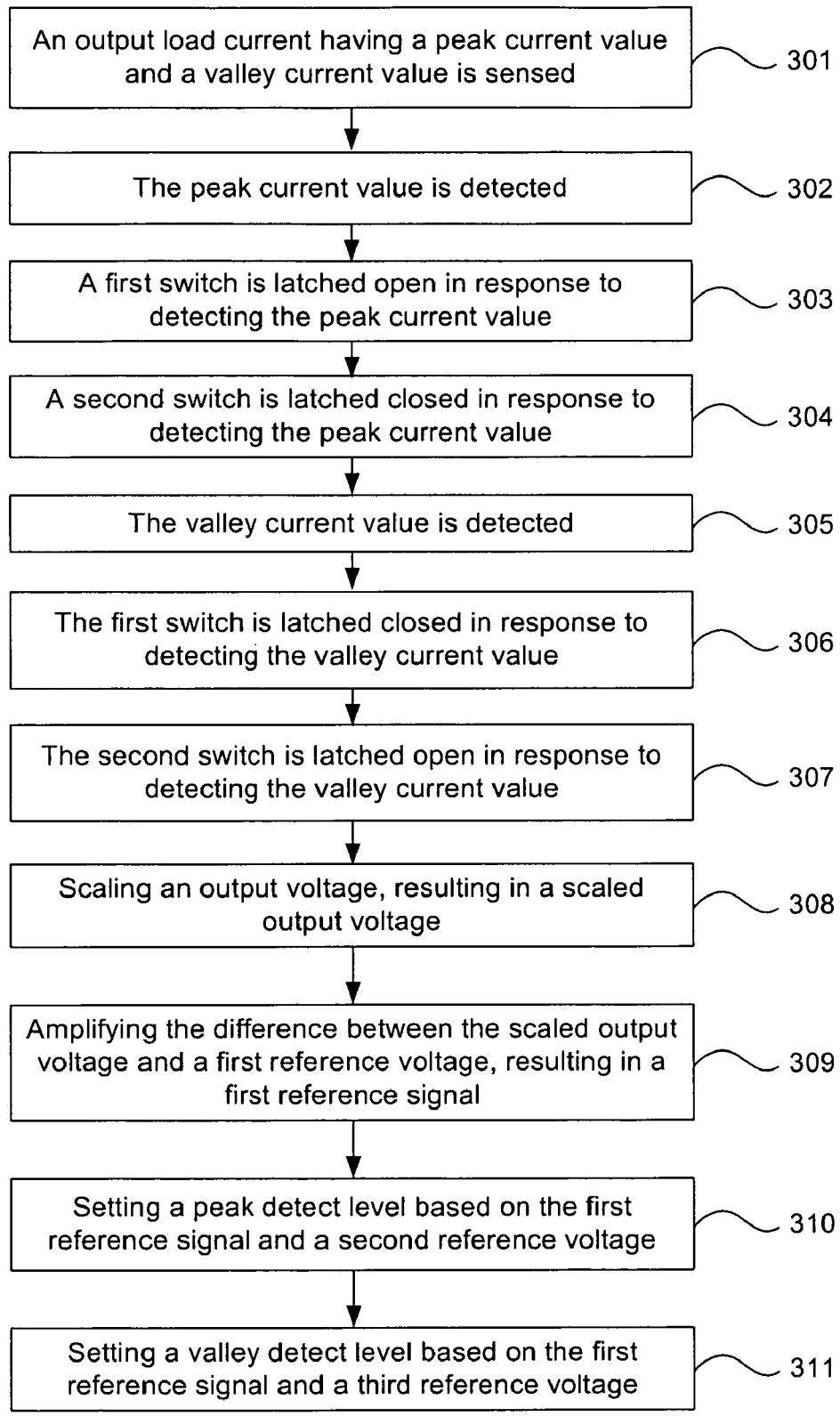
FIG. 3 illustrates a method according to one embodiment of the present invention.

FIG. 3 illustrates a method 300 according to one embodiment of the present invention.

At 301, an inductor current is sensed. The inductor current has a peak current value and a valley current value. The peak current value is higher than the valley current value being a lower current. The inductor current passes through a load. As an example, in the embodiment shown in FIG. 1, current sensor 132 senses the inductor current $i_L$ through the output load 121.

At 302, the peak current value is detected. As an example, in the embodiment shown in FIG. 1, comparator 101 detects the peak current value. The logic drive reference signal at node 117 and the voltage reference 103 set a peak detect threshold at the inverting terminal of the comparator 101. The sense voltage is provided to the non-inverting terminal of the comparator 101. In this manner, the peak current value is detected.

At 303, a first switch is latched open in response to detecting the peak current value. As an example, in the embodiment shown in FIG. 1, comparator 101 detects the peak current value and provides the first component of the first comparator output signal which resets the latch 105, The latch 105 provides the first component of the first latch output signal to open the switch 107 in response to the first component of the first comparator output signal.

At 304, a second switch is latched closed in response to detecting the peak current value. The latching the first switch open and the latching the second switch closed allows the inductor current to decrease to the valley current value.

At 305, the valley current value is detected. As an example, in the embodiment shown in FIG. 1, comparator 102 detects the valley current value. The logic drive reference signal at node 117 and the voltage reference 104 set a valley detect threshold at the non-inverting terminal of the comparator 102. The sense voltage is provided to the inverting terminal of the comparator 102. In this manner, the valley current value is detected.

At 306, the first switch is latched closed in response to detecting the valley current value. As an example, in the embodiment shown in FIG. 1, comparator 102 detects the valley current value and provides a first component of the second comparator output signal which sets the latch 105. The latch 105 provides a first component of the first latch output signal to open the switch 107 in response to the first component of the first comparator output signal.

At 307, the second switch is latched open in response to detecting the valley current value. The latching the first switch closed and the second switch open allows the inductor current to increase to the peak current value.

At 308, an output voltage is scaled resulting in a scaled output voltage. As an example, in the embodiment shown in FIG. 1, the load resistor 111 and the load resistor 112 form a voltage divider and provide the scaled output voltage at node 124.

At 309, a difference between the scaled output voltage and a first reference voltage is amplified which results in a first reference signal. As an example, in the embodiment shown in FIG. 1, loop amplifier 116 provides the logic drive reference signal such that a scaled output voltage from an intermediate node 124 of the output load 121 matches the voltage of the loop voltage reference 118, and accordingly the logic drive circuit 123 provides a control signal which produces an output voltage $V_{OUT}$ across the output load 121 which corresponds to the voltage of the loop voltage reference 118.

At 310, a peak detect level is set based on the first reference signal and a second reference voltage. As an example, in the embodiment shown in FIG. 1, the logic drive reference signal at node 117 and the voltage reference 103 set a peak detect threshold at the non-inverting terminal of the comparator 101.

At 311, a valley detect level is set based on the first reference signal and a third reference voltage. As an example, in the embodiment shown in FIG. 1, the logic drive reference signal at node 117 and the voltage reference 104 set a valley detect threshold at the non-inverting terminal of the comparator 102.

The first reference voltage, the second reference voltage, and the third reference voltage may be predetermined. The logic drive reference signal establishes an output voltage such that the scaled output voltage matches the first reference voltage. Accordingly, the first reference signal establishes the output voltage which corresponds to the first reference voltage.

Figure 4:
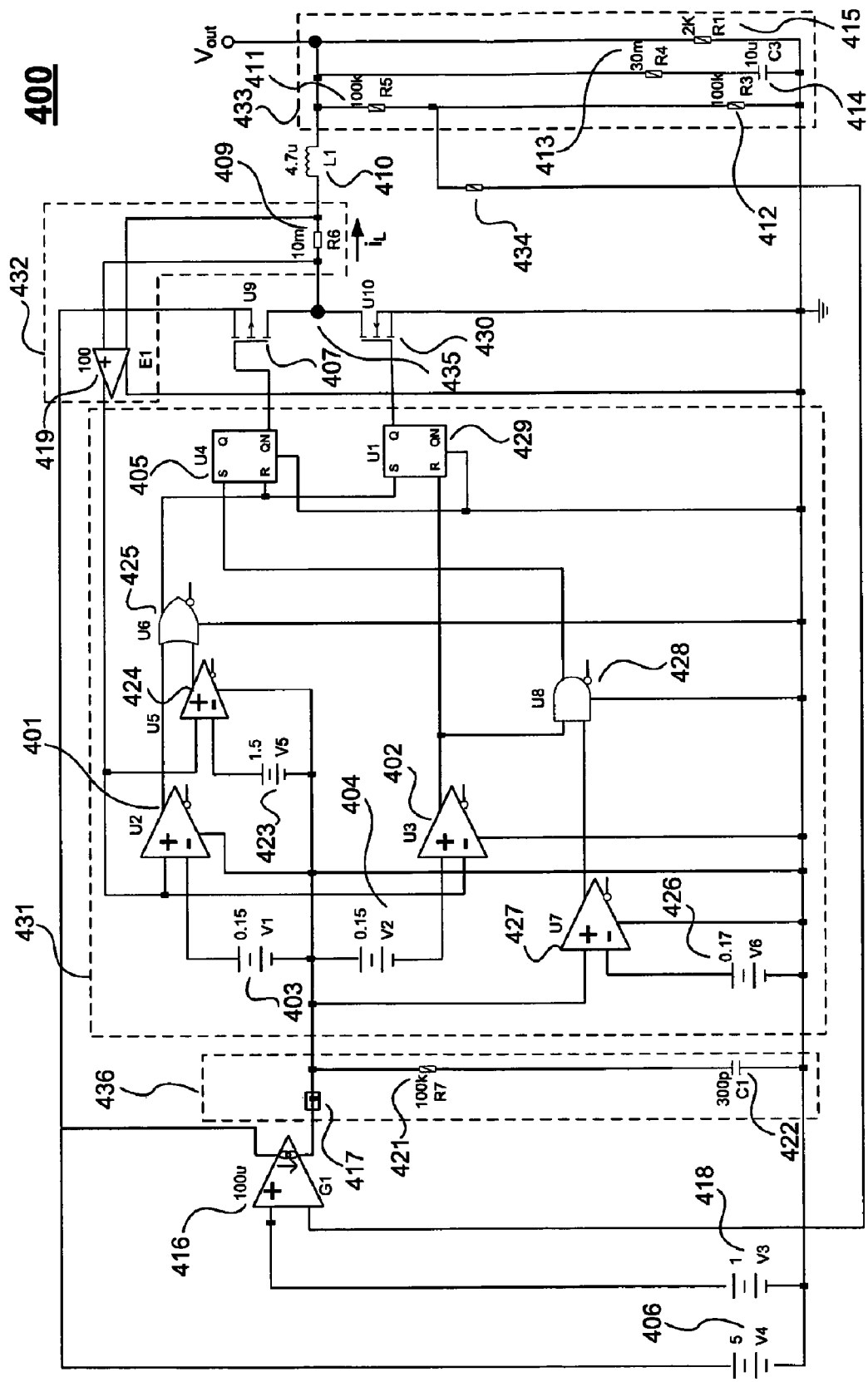
FIG. 4 illustrates an electronic circuit according to another embodiment of the present invention.

FIG. 4 illustrates an electronic circuit 400 according to another embodiment of the present invention. The electronic circuit 400 is configured to act as a buck converter. However, other types of converter configurations may be implemented as well. Electronic circuit 400 includes a logic drive circuit 431, a switch 407, a switch 430, a loop amplifier 416, a loop voltage reference 418, an electrical network 436, a current sensor 432, an inductor 410, and an output load 433. The loop amplifier 416, the loop voltage reference 418, the current sensor 432, the inductor 410, and the output load 433 function in a similar manner to corresponding components 116, 118, 132, 110, and 133 in circuit 110 as described above.

The logic drive circuit 431 controls both switch 407 and switch 430. Logic drive circuit 431 includes a comparator 401, a comparator 402, a voltage reference 403, a voltage reference 404, a latch 405, and a latch 429. The comparator 4013 the comparator 402, the voltage reference 403, the voltage reference 404, the latch 405, and the switch 407 function in a similar manner to corresponding components 101, 102, 103,104, 105, and 107 in circuit 100 as described above. The switch 430 operates as a rectifying switch. The switch 430 replaces the diode 108 for circuit 100 described above. The rectifying switch 430 allows for lower input voltages to be generated at the output. Switch 430 has a first terminal coupled to a switching node 435, a second terminal coupled to a reference voltage, and a control terminal. The latch 429 has an output coupled to the control input of the switch 430, a set terminal coupled to the output terminal of the comparator 401, and a reset terminal coupled to the output terminal of the comparator 402.

The inductor current $i_L$ includes a peak current value and a valley current value. The peak current value is higher than the valley current value. The comparator 401 detects the peak current value and provides a first component of a first comparator output signal which resets latch 405 and sets latch 429. Latch 405 provides a first component of the first latch output signal to open switch 407 in response to the first component of the first comparator output signal. Latch 429 provides a first component of the second latch output signal to close switch 430 in response to the first component of the first comparator output signal. This allows the inductor current $i_L$ to decrease.

The comparator 402 detects the valley current value and provides a first component of a first comparator output signal which sets latch 405 and resets latch 429. Latch 405 provides a second component of the first latch output signal to close switch 407 in response to the first component of the second comparator output signal. Latch 429 provides a second component of the second latch output signal to open switch 430 in response to the first component of the first comparator output signal. This allows the inductor current $i_L$ to decrease. Once again the output current begins to rise and the cycle repeats.

Logic drive circuit 431 further comprises a current limit circuit comprising a third comparator 424 and OR gate 425. The third comparator 424 has a non-inverting terminal, an inverting terminal, and an output terminal. The non-inverting terminal is coupled to receive the sense voltage. The inverting terminal is coupled to a current limit voltage reference 424. The output terminal is coupled to a first input of the OR gate 424. A second input of OR gate 424 is coupled to the output of comparator 401. The output of OR gate 424 is coupled to the reset terminal of latch 405 and the set terminal of latch 429. Comparator 424 provides a first component of a third comparator output signal when the sense voltage exceeds a current limit reference voltage value. The first component of the third comparator output signal resets latch 405 and sets latch 429. This third comparator output signal propagates through the OR gate 425. Latch 405 provides a first component of the first latch output signal to open switch 407 in response to the first component of the third comparator output signal. Latch 429 provides a first component of the second latch output signal to close switch 430 in response to the first component of the third comparator output signal. This allows the inductor current $i_L$ to decrease.

The electronic circuit 400 further comprises a pulse frequency modulation (PFM) mode circuit comprising a comparator 427, a voltage reference 426 having a reference voltage $V_6$, and a AND gate 428. A non-inverting terminal of the comparator 427 is coupled to node 417. An inverting terminal of the comparator 427 is coupled to receive the reference voltage $V_6$ from voltage reference 426. The output of the comparator 427 is coupled to a first input of the AND gate 428. A second input of AND gate 428 is coupled to the output of the comparator 402. The output of the AND gate 428 is coupled to the set terminal of latch 405. Comparator 427 detects the voltage at node 417. Under light load conditions the voltage at node 417 may fall. When the voltage at node 417 falls below $V_6$, both switch 407 and switch 430 will open. The switching may begin again when the voltage at node 417 rises in response to the voltage at node 434. This pulse frequency modulating mode reduces the overall time the switches (407 and 430) are switching and therefore may reduce power consumption at light loads. This may also reduce the reverse current flowing through switch 430.

The electrical network 436 includes resistor 421, and capacitor 422. Resistor 421 and capacitor 422 provide compensation to the feed back loop formed when the scaled output voltage is provided to the inverting terminal of loop amplifier 416. The loop amplifier 416 is a transconductance amplifier and electrical network 436 may aid in converting the current output of the amplifier into a voltage.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A DC to DC converter device including an electronic circuit, the electronic circuit comprising:
 a first comparator having an inverting terminal coupled to receive a first reference signal, a non-inverting terminal, and an output terminal;
 a second comparator having an inverting terminal, a non-inverting terminal coupled to receive the first reference signal, and an output terminal;
 a first switch having a first terminal coupled to a first voltage source, a second terminal coupled to an output load, and a control terminal;
 a first latch having a set terminal coupled to the output of the second comparator, a reset terminal coupled to the output of the first comparator, and an output coupled to the control terminal of the first switch; and
 a current sensor coupled to sense an inductor current flowing through the output load, and coupled to provide a sense voltage to the non-inverting terminal of the first comparator and the inverting terminal of the second comparator, the sense voltage corresponding to the inductor current;
 wherein the inductor current includes a peak current value and a valley current value, the peak current value being higher than the valley current value,
 wherein the first comparator detects the peak current value and provides a first component of a first comparator output signal which resets the first latch, the first latch provides a first component of a first latch output signal to open the first switch in response to said first component of said first comparator output signal,
 wherein the second comparator detects the valley current value and provides a first component of a second comparator output signal which sets the first latch, the first latch provides a second component of the first latch output signal to close the first switch in response to said first component of said second comparator output signal.

2. The electronic circuit of claim 1 further comprising:
 a first diode having a first terminal coupled to the output load, a second terminal coupled to a return reference voltage.

3. The electronic circuit of claim 1 further comprising:
 a second switch having a first terminal coupled to the output load, a second terminal coupled to a return reference voltage, and a control terminal; and
 a second latch having a set terminal coupled to the output of the first comparator, a reset terminal coupled to the output of the second comparator, and an output coupled to the control terminal of the second switch,
 wherein the first component of the first comparator output signal sets the second latch, the second latch providing a first component of a second latch output signal to close the second switch in response to said first component of said first comparator output signal,
 wherein the first component of the second comparator output signal resets the second latch, the second latch providing a second component of the second latch output signal to open the second switch in response to said first component of said second comparator output signal.

4. The electronic circuit of claim 3, wherein the first switch and the second switch are field effect transistors.

5. The electronic circuit of claim 3 further comprising:
 a current limit circuit comprising:
  a third comparator having a non-inverting terminal coupled to receive the sense voltage, an inverting terminal coupled to a current limit reference voltage having a current limit reference voltage value, and an output terminal coupled to provide a first component of a third comparator output signal when the sense voltage exceeds the current limit reference voltage value,
  wherein the first component of the third comparator output signal resets the first latch, the first latch providing the first component of the first latch output signal to open the first switch in response to said third comparator output signal,
  wherein the third comparator output signal sets the second latch, the second latch providing the first component of the second latch output signal to close the second switch in response to said third comparator output signal.

6. The electronic circuit of claim 5 wherein the current limit circuit further comprises:
 an OR gate having a first terminal coupled to the output terminal of the third comparator, a second terminal coupled to the output terminal of the first comparator, and an output terminal coupled to the reset terminal of the first latch, wherein the OR gate allows the first comparator output signal to couple to the reset terminal of the first latch while the sense voltage is below the current limit reference voltage value.

7. The electronic circuit of claim 1 further comprising:
a first voltage reference having a first terminal coupled to the inverting terminal of the first comparator and a second terminal coupled to receive a first reference signal, the first voltage reference providing a first reference voltage; and
a second voltage reference having a first terminal coupled to receive the first reference signal and a second terminal coupled to the non-inverting terminal of the second comparator, the second voltage reference providing a second reference voltage,
wherein a peak detect threshold comprises the first reference signal and the first reference voltage,
wherein a valley detect threshold comprises the first reference signal and the second reference voltage.

8. The electronic circuit of claim 1 further comprising:
a divider circuit coupled to receive an output voltage and coupled to provide a scaled output voltage;
a loop amplifier having a non-inverting terminal, an inverting terminal coupled to receive the scaled output voltage, and an output terminal coupled to generate the first reference signal; and
a loop voltage reference having a first terminal coupled to the non-inverting terminal of the loop amplifier and a second terminal coupled to receive a return reference voltage, the loop voltage reference providing a loop reference voltage,
wherein the loop amplifier generates the first reference signal in which the scaled output voltage matches the loop reference voltage, and in accordance therewith providing the output voltage corresponding to the loop reference voltage.

9. The electronic circuit of claim 8, wherein the loop amplifier is a transconductance amplifier, and wherein the electronic circuit further comprises:
a network having a first terminal coupled to the output of the loop amplifier and a second terminal coupled to a reference voltage.

10. A voltage regulator device including an electronic circuit, the electronic circuit comprising:
a first comparator having an inverting terminal coupled to receive a first reference signal, a non-inverting terminal, and an output terminal;
a second comparator having an inverting terminal, a non-inverting terminal coupled to receive the first reference signal, and an output terminal;
a first switch having a first terminal coupled to a first voltage source, a second terminal coupled to an output load, and a control terminal;
a first latch having a set terminal coupled to the output of the second comparator, a reset terminal coupled to the output of the first comparator, and an output terminal coupled to the control input of the first switch;
a sense resistor having a first terminal coupled the second terminal of the first switch and a second terminal coupled to the output load in series with an inductor; and
a differential amplifier having a first terminal coupled to the first terminal of the sense resistor, a second terminal coupled to the second terminal of the sense resistor, and an output terminal coupled to provide a sense voltage to the non-inverting terminal of the first comparator and the inverting terminal of the second comparator, the sense voltage corresponding to an inductor current through said inductor;
wherein the inductor current includes a peak current value and a valley current value, the peak current value being higher than the valley current value,
wherein the first comparator detects the peak current value and provides a first component of a first comparator output signal which resets the first latch, the first latch provides a first component of a first latch output signal to open the first switch in response to said first component of said first comparator output signal,
wherein the second comparator detects the valley current value and provides a first component of a second comparator output signal which sets the first latch, the first latch provides a second component of the first latch output signal to close the first switch in response to said first component of said second comparator output signal.

11. The electronic circuit of claim 10, wherein the first switch is a field effect transistor.

12. The electronic circuit of claim 10 further comprising:
a first diode having a first terminal coupled to the output load, a second terminal coupled to a return reference voltage.

13. The electronic circuit of claim 10 further comprising:
a second switch having a first terminal coupled to the output load, a second terminal coupled to a return reference voltage, and a control terminal; and
a second latch having a set terminal coupled to the output of the first comparator, a reset terminal coupled to the output of the second comparator, and an output coupled to the control terminal of the second switch,
wherein the first component of the first comparator output signal sets the second latch, the second latch providing a first component of a second latch output signal to close the second switch in response to said first component of said first comparator output signal,
wherein the first component of the second comparator output signal resets the second latch, the second latch providing a second component of the second latch output signal to open the second switch in response to said first component of said second comparator output signal.

14. The electronic circuit of claim 13, wherein the first switch and the second switch are field effect transistors.

15. The electronic circuit of claim 13 further comprising:
a current limit circuit comprising:
a third comparator having a non-inverting terminal coupled to receive the sense voltage, an inverting terminal coupled to a current limit reference voltage having a current limit reference voltage value, and an output terminal coupled to provide a third comparator output signal when the sense voltage exceeds the current limit reference voltage value,
wherein the third comparator output signal resets the first latch, the first latch providing the first component of the first latch output signal to open the first switch in response to said third comparator output signal,
wherein the third comparator output signal sets the second latch, the second latch providing the first component of the second latch output signal to close the second switch in response to said third comparator output signal.

16. The electronic circuit of claim 15 wherein the current limit circuit further comprises:
an OR gate having a first terminal coupled to the output terminal of the third comparator, a second terminal coupled to the output terminal of the first comparator, and an output terminal coupled to the reset terminal of the first latch, wherein the OR gate allows the first comparator output signal to couple to the reset terminal of the first latch while the sense voltage is below the current limit reference voltage value.

17. The electronic circuit of claim 10 further comprising:
a first voltage reference having a first terminal coupled to the inverting terminal of the first comparator and a second terminal coupled to receive a first reference signal, the first voltage reference providing a first reference voltage; and
a second voltage reference having a first terminal coupled to receive the first reference signal and a second terminal coupled to the non-inverting terminal of the second comparator, the second voltage reference providing a second reference voltage,
wherein a peak detect threshold comprises the first reference signal and the first reference voltage,
wherein a valley detect threshold comprises the first reference signal and the second reference voltage.

18. The electronic circuit of claim 10 further comprising:
a divider circuit coupled to receive an output voltage and coupled to provide a scaled output voltage;
a loop amplifier having a non-inverting terminal, an inverting terminal coupled to receive the scaled output voltage, and an output terminal coupled to provide the first reference signal; and
a loop voltage reference having a first terminal coupled to the non-inverting terminal of the loop amplifier and a second terminal coupled to receive a return reference voltage, the loop voltage reference providing a loop reference voltage,
wherein the loop amplifier generates the first reference signal in which the scaled output voltage matches the loop reference voltage, and in accordance therewith providing the output voltage corresponding to the loop reference voltage.

19. The electronic circuit of claim 18, wherein the loop amplifier is a transconductance amplifier and the electronic circuit further comprises a first resistor having a first terminal coupled to the output of the loop amplifier and a second terminal coupled to receive a return reference voltage.

20. A method for providing DC to DC conversion comprising the steps of:

sensing an inductor current having a peak current value and a valley current value, the peak current value being higher than the valley current value, the inductor current passing through a load;
detecting the peak current value;
latching a first switch open in response to detecting the peak current value;
detecting the valley current value; and
latching the first switch closed in response to detecting the valley current value,
wherein the step of latching the first switch open allows the inductor current to decrease to the valley current value,
wherein the step of latching the first switch closed allows the inductor current to increase to the peak current value.

21. The method of claim 20 further comprising:
latching a second switch closed in response to detecting the peak current value; and
latching the second switch open in response to detecting the valley current value,
wherein the step of latching the first switch open and the latching the second switch closed allows the inductor current to decrease to the valley current value,
wherein the step of latching the first switch closed and the latching the second switch open allows the inductor current to increase to the peak current value.

22. The method of claim 20 further comprising:
scaling an output voltage, resulting in a scaled output voltage;
amplifying a difference between the scaled output voltage and a first reference voltage, resulting in a first reference signal;
setting a peak detect level based on the first reference signal and a second reference voltage; and
setting a valley detect level based on the first reference signal and a third reference voltage;
wherein the first reference voltage, the second reference voltage, and the third reference voltage are predetermined,
wherein the step of amplifying generates the first reference signal in which the scaled output voltage matches the first reference voltage, and in accordance therewith provides the output voltage corresponding to the first reference voltage.

* * * * *